United States Patent Office 3,767,643
Patented Oct. 23, 1973

3,767,643
5-(AMINOBENZENESULFONYLAMINO)-
BENZIMIDAZOLONE
Walter Kunstmann, Neuenhain, Taunus, Joachim Ribka, Offenbach (Main), and Peter Junker, Niederhochstadt, Taunus, Germany, assignors to Farbwerke Hoechst Aktiengesellschaft vormals Meister Lucius & Bruning, Frankfurt am Main, Germany
No Drawing. Filed Sept. 6, 1972, Ser. No. 286,774
Claims priority, application Germany, Sept. 8, 1971,
P 21 44 908.1
Int. Cl. C07d 49/38
U.S. Cl. 260—239.9                    1 Claim

ABSTRACT OF THE DISCLOSURE

New 5 - (aminobenzenesulfonylamino) - benzimidazolones of the general formula

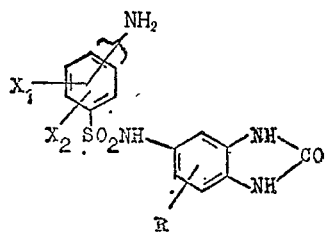

in which $X_1$ and $X_2$ are equal or different and represent a hydrogen atom, a lower alkyl or alkoxy group having 1–4 carbon atoms or a halogen atom, preferably a chlorine or bromine atom, and R represents a hydrogen or halogen atom, preferably, a chlorine or bromine atom, a methyl, ethyl, methoxy or ethoxy group. They may be prepared by reacting benzenesulfochlorides of the general formula

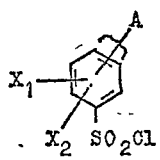

with 5-amino-benzimidazolones of the general formula

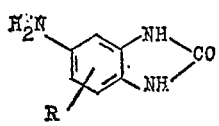

in which Formulae A represents a nitro or acetylamino group and $X_1$, $X_2$ and R are defined as above, and hydrolysing the acetyl group in the products thus obtained or reducing the nitro group to the amino group.

These 5 - (aminobenzenesulfonylamino) - benzimidazolones can be coupled in their diazotized form with N-acetoacetylamino compounds of the benzene-, diphenyl- and benzimidazolone series to mono and disazo pigments which are distinguished by excellent properties of fastness and very pure and brilliant shades.

---

The present invention relates to new 5-(aminobenzenesulfonylamino)-benzimidazolones of the general formula

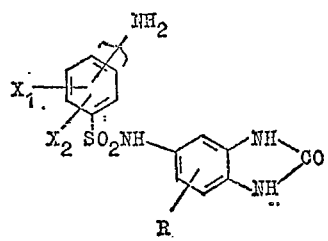

in which $X_1$ and $X_2$ are equal or different and represent a hydrogen atom, a lower alkyl or alkoxy group having 1–4 carbon atoms or a halogen atom, preferably a chlorine or bromine atom, and R represents a hydrogen or halogen atom, preferably, a chlorine or bromine atom, a methyl, ethyl, methoxy or ethoxy group.

The present invention also provides a process for preparing the 5-(aminobenzenesulfonylamino)-benzimidazolones of the above formula which comprises reacting benzenesulfochlorides of the general formula

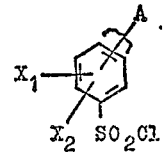

with 5-amino-benzimidazolones of the general formula

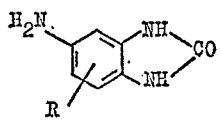

in which Formulae A represents a nitro or acetylamino group and $X_1$, $X_2$ and R are defined as above, and hydrolysing the acetyl group in the products thus obtained or reducing the nitro group to the amino group.

The 5-amino-benzimidazolones used are for the most part known and they can be prepared according to known methods, e.g. by melting together 4-nitro-o-phenylene diamines with urea and subsequently reducing the nitro group. As 5-amino-benzimidazolones there may be used:

5-amino-benzimidazolones,
6-chloro-5-amino-benzimidazolone,
7-chloro-5-amino-benzimidazolone,
6-bromo-5-aminobenzimidazolone,
7-bromo-5-aminobenzimidazolone,
6-methyl-5-aminobenzimidazolone,
7-methyl-5-aminobenzimidazolone,
7-ethyl-5-aminobenzimidazolone,
7-methoxy-5-aminobenzimidazolone or
7-ethoxy-5-aminobenzimidazolone.

As benzenesulfochlorides there are mentioned, for example, 4-acetaminobenzenesulfochloride,
2,5-dimethyl-4-acetaminobenzenesulfochloride,
3-chloro-4-acetamino-benzenesulfochloride,
3-bromo-4-acetamino-benzenesulfochloride,
2,5-dichloro-4-acetaminobenzenesulfochloride,
3-methyl-4-acetaminobenzenesulfochloride,
3-n-butyl-4-acetaminobenzenesulfochloride,
2,5-dimethyl-4-acetaminobenzenesulfochloride,
2,5-di-n-propyl-4-acetaminobenzenesulfochloride,
2-chloro-5-ethyl-4-acetaminobenzenesulfochloride,
2,5-dimethoxy-4-acetaminobenzenesulfochloride,
2,5-diethoxy-4-acetaminobenzenesulfochloride,
2-ethoxy-5-methoxy-4-acetamino-benzenesulfochloride,
2-methyl-5-ethyl-4-acetaminobenzenesulfochloride,
2-methyl-5-ethoxy-4-acetaminobenzenesulfochloride,
2-chloro-5-methyl-4-acetaminobenzenesulfochloride,
2-methoxy-5-bromo-4-acetaminobenzenesulfochloride,
2-propoxy-5-chloro-4-acetamino-benzenesulfochloride,
2-chloro-5-ethoxy-4-acetaminobenzenesulfochloride,
3-acetaminobenzenesulfochloride,
4-chloro-3-acetaminobenzenesulfochloride,
4-methoxy-3-acetaminobenzenesulfochloride,
4-ethyl-3-acetaminobenzenesulfochloride, 6-chloro-4-ethyl-3-acetaminobenzenesulfochloride,
4,6-dimethyl-3-acetaminobenzenesulfochloride,
4-butoxy-3-acetaminobenzenesulfochloride,
4-methoxy-6-bromo-3-acetaminobenzenesulfochloride or
4-methyl-6-n-butyl-3-acetaminobenzenesulfochloride.

As starting compounds there may be used in the same manner compounds which differ from the aforementioned compounds in that they have a nitro group instead of the acetylamino group. Preferred compounds are particularly 4-acetaminochlorides or 4 - nitrobenzenesulfochlorides having hydrogen or chlorine atoms or methoxy groups in position 2 and 5. Instead of the said benzenesulfochlorides there may also be used other reactive benzenesulfonic acid derivatives such as benzenesulfobromides.

These aminobenzensulfochlorides may be obtained by known methods, for example by reacting acetanilides with chlorosulfonic acid or by treating the alkali salts of the acetylaminobenzenesulfonic acids with phosphorus pentachloride. The condensation of the benzenesulfochlorides with 5-aminobenzimidazolones is carried out by known methods by reacting equimolar quantities of both reactants in an aqueous medium or in organic solvents at temperatures between 0° and 200° C., preferably in boiling dioxane, in the presence of bases such as alkali-hydroxides or carbonates, or tertiary amines such as triethylamines, in order to bind the acid which is formed.

The subsequent hydrolysis of the N-acetyl group serving as protecting group is performed by treatment with acids or bases, preferably with boiling diluted sodium hydroxide solution. The nitro group is reduced to the amino group according to usual methods, preferably by hydrogenation under pressure in the presence of nickel catalysts. The products are obtained in a very pure form and in a high yield. They can be recrystallized from mixtures of dimethyl formamide, ethanol and water and are obtained in the form of colorless or weakly yellow crystals which decompose at the melting point.

The 5 - (aminobenzenesulfonylamino) - benzimidazolones can be coupled in their diazotized form with N-acetoacetylamino compounds of the benzene-, diphenyl- and benzimidazolone series to mono and disazo pigments which are distinguished by excellent properties of fastness and very pure and brilliant shades.

The following examples serve to illustrate the invention but they are not intended to limit it thereto.

EXAMPLE 1

149 grams of 5-aminobenzimidazolone, 2 l. of dioxane, 150 g. of triethylamine and 294 g. of 4-acetylamino-2,5-dimethoxybenzenesulfonic acid chloride were mixed at room temperature and boiled under reflux for 3 hours, while stirring. The mixture was then diluted with 4 l. of water and adjusted to pH 6–7 by means of concentrated hydrochloric acid. The precipitate was then sucked off, washed with a small amount of water and heated—when still wet—for one and a half hours with 2.5 l. of water and 450 ml. of a 33% sodium hydroxide solution. The solution thus formed was purified while hot with active charcoal and kieselguhr and neutralized at 20° C. with 600–700 ml. of 5n-hydrochloric acid. The precipitate was sucked off, washed with water and dried at 80° C. There were obtained 307 g. (87% of the theory) of 5-(4' - amino - 2',5' - dimethoxy-benzenesulfonylamino)-benzimidazolone of the formula

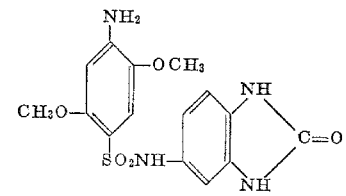

Melting point 290° C. (decomposition).

The following Table 1 contains further 5-(4'-aminobenzenesulfonylamino)-benzimidazolones likewise prepared as described in Example 1. The melting points are not corrected.

TABLE 1

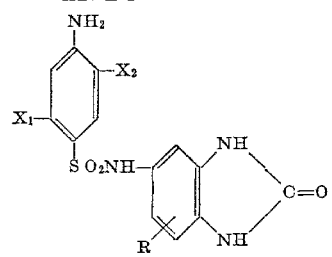

| $X_1$ | $X_2$ | R | M.P. (° C.) | $X_1$ | $X_2$ | R | M.P. (° C.) |
|---|---|---|---|---|---|---|---|
| H | H | H | 293–293.5 | $CH_3$ | $OC_2H_5$ | 7-Cl | 249–249.5 |
| H | H | 7-Cl | 265.5 | $OCH_3$ | $OCH_3$ | 7-Cl | 263.5–264 |
| H | H | 7-Br | 279–279.5 | $OCH_3$ | $OCH_3$ | 7-Br | 250.5–254.5 |
| H | H | 7-$OCH_3$ | 301–302 | $OCH_3$ | $OCH_3$ | 7-$OCH_3$ | 254.5 |
| H | H | 7-$CH_3$ | 259.5–260 | $OCH_3$ | $OCH_3$ | 7-$CH_3$ | 286 |
| H | H | 6-$CH_3$ | 295.5 | $OCH_3$ | $OCH_3$ | 6-$CH_3$ | 285 |
| H | $CH_3$ | H | 289–290 | $OC_2H_5$ | $OC_2H_5$ | H | 234–234.5 |
| H | $CH_3$ | 7-Cl | 284–287 | $OC_2H_5$ | $OC_2H_5$ | 7-Cl | 238–238.5 |
| H | $CH_3$ | 6-$CH_3$ | 302.5–303 | $OC_2H_5$ | $OC_2H_5$ | 7-Br | 233–235 |
| $CH_3$ | $CH_3$ | H | 282–283.5 | $OC_2H_5$ | $OC_2H_5$ | 7-$OCH_3$ | 220.5–221 |
| $CH_3$ | $CH_3$ | 7-Cl | 285 | $OC_2H_5$ | $OC_2H_5$ | 7-$CH_3$ | 255–255.5 |
| $CH_3$ | $CH_3$ | 7-Br | 280–280.5 | $OC_2H_5$ | $OC_2H_5$ | 6-$CH_3$ | 237.5–238.5 |
| $CH_3$ | $CH_3$ | 7-$OCH_3$ | 264.5 | H | Cl | H | 327 |
| $CH_3$ | $CH_3$ | 7-$CH_3$ | 282–283 | H | Cl | 7-Cl | 279.5–280.5 |
| $CH_3$ | $CH_3$ | 6-$CH_3$ | 275–276 | Cl | H | H | 305 |
| $CH_3$ | $OCH_3$ | H | 284 | Cl | H | 7-Cl | 305 |
| $CH_3$ | $OCH_3$ | 7-Cl | 260 | Cl | Cl | H | 327.5–328 |
| $CH_3$ | $OCH_3$ | 7-Br | 263–264 | Cl | Cl | 7-Cl | 320–321.5 |
| $CH_3$ | $OCH_3$ | 7-$OCH_3$ | 231.5 | Cl | $CH_3$ | H | 313–314 |
| $CH_3$ | $OCH_3$ | 7-$CH_3$ | 287 | Cl | $CH_3$ | 7-Cl | 293 |
| $CH_3$ | $OCH_3$ | 6-$CH_3$ | 294–294.5 | Cl | $OCH_3$ | H | 326.5–328 |
| $CH_3$ | $OC_2H_5$ | H | 249–250 | Cl | $OCH_3$ | 7-Cl | 301.5 |

EXAMPLE 2

14.9 g. of 5-amino-benzimidazolone and 22.2 g. of 3-nitrobenzenesulfonic acid chloride were reacted in 250 ml. of dioxane and 15 g. of triethylamine as described in Example 1. The primary product thus obtained was suspended in wet condition in 500 ml. of methanol and hydrogenated at 90–110° C. and a hydrogen pressure of 50 atmospheres in an autoclave in the presence of 3 g. of a nickel catalyst. After the hydrogen absorption was finished, 1 g. of active charcoal and 50 ml. of dimethylformamide were added and the whole was filtrated in hot condition. The filtrate was introduced into 1.5 l. of ice water. The precipitate was sucked off and dried at 80° C. There were obtained 25.8 g. (85% of the theory) of 5-(3'-amino-benzenesulfonylamino)-benzimidazolone of the formula

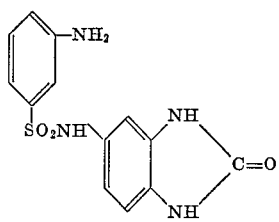

Melting point 290–291° C. (with decomposition).

All 5 - (3' - aminobenzenesulfonylamino)-benzimidazolones listed in the following Table 2 were prepared according to Example 1, with the exception of the first one which was prepared as described in Example 2.

TABLE 2

| $X_1$ | $X_2$ | R | M.P. (° C.) |
|---|---|---|---|
| H | H | 7-Cl | 249–251.5 |
| H | $CH_3$ | H | 288–291 |
| H | $CH_3$ | 7-Cl | 286.5–287 |
| H | $OCH_3$ | H | 276.5–277.5 |
| H | $OCH_3$ | 7-Cl | 293.5–294 |
| H | $OCH_3$ | 7-$OCH_3$ | 288.5–289 |
| H | $OCH_3$ | 7-$CH_3$ | 263–269 |
| H | $OCH_3$ | 6-$CH_3$ | 270–271 |
| $CH_3$ | $CH_3$ | H | 341.5 |
| $CH_3$ | $CH_3$ | 7-Cl | 337 |
| $CH_3$ | H | H | 316 |
| $CH_3$ | H | 6-$CH_3$ | 345 |

We claim:
1. A 5-(aminobenzenesulfonylamino)-benzimidazolone of the formula

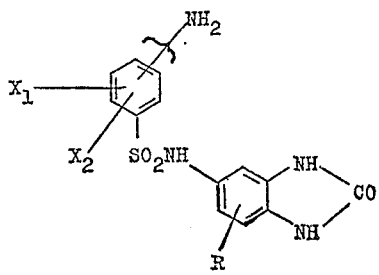

wherein $X_1$ and $X_2$ is hydrogen, chlorine or bromine or alkyl or alkoxy each with 1–4 carbon atoms and R is hydrogen, chlorine or bromine or methyl, ethyl, methoxy or ethoxy.

References Cited
UNITED STATES PATENTS 2,336,664   12/1943   Zwilgmeyer _____ 260—304

HENRY R. JILES, Primary Examiner

C. M. S. JAISLE, Assistant Examiner

U.S. Cl. X.R.

260—309.2, 157; 106—288 Q